United States Patent
Liberti et al.

(10) Patent No.: US 6,898,430 B1
(45) Date of Patent: May 24, 2005

(54) METHODS FOR ESTABLISHING RELIABLE COMMUNICATIONS BETWEEN TWO POINTS IN A MOBILE WIRELESS NETWORK

(75) Inventors: Joseph C. Liberti, Howell, NJ (US); Joseph E. Wilkes, Middletown, NJ (US); Paul G. Zablocky, Shrewsbury, NJ (US)

(73) Assignee: Telecordia Technologies, Inc., Piscataway, NJ (US)

( * ) Notice: Subject to any disclaimer, the term of this patent is extended or adjusted under 35 U.S.C. 154(b) by 706 days.

(21) Appl. No.: 09/698,970

(22) Filed: Oct. 27, 2000

Related U.S. Application Data (60) Provisional application No. 60/161,832, filed on Oct. 27, 1999.

(51) Int. Cl.[7] ................................................ H04Q 7/20
(52) U.S. Cl. .................... 455/445; 455/3.03; 455/421.1; 455/515; 455/11.1
(58) Field of Search ................................. 455/420, 421, 455/3.03, 3.04, 434, 445, 446, 452.1, 452.2, 450, 436, 11.1, 9, 502, 515, 517

(56) References Cited

U.S. PATENT DOCUMENTS

| | | | | |
|---|---|---|---|---|
| 5,901,362 A | * | 5/1999 | Cheung et al. | ............ 455/11.1 |
| 6,026,297 A | * | 2/2000 | Haartsen | ................... 455/426.1 |
| 6,304,745 B1 | * | 10/2001 | Monch | ........................ 455/445 |
| 6,434,132 B1 | * | 8/2002 | Ishii et al. | ................... 370/445 |

* cited by examiner

*Primary Examiner*—Nay Maung
*Assistant Examiner*—John J. Lee
(74) *Attorney, Agent, or Firm*—Joseph Giordano; James W. Falk (57) ABSTRACT

Reliable transferring of data between mobile wireless nodes positioned at two points in a wireless network occurs through the dynamic formation of transmit/receive groups that collectively establish reliable communications. A mobile node at each point creates a neighbor list by periodically probing its surroundings to discover nearby nodes with which it can relaibly communicate. Prior to establishing a route or transmitting data, a node A first probes a distant next point in the network to determine if it can reliably communicate with that point. Upon receiving this probe and knowing one's neighbors, the nodes at this distant point dynamically form a receive group and choose a controlling node. Members of the group individually receive all future data from node A and pass the received data to the controlling node, which combines the individual signals for reliable reception. Similary, the controlling node reliably transmits data to node A by having each member of the receive group transmit the data, node A then combining the signals. Lastly, the nodes neighboring node A can form a transmit/receive group to assist node A in communicating with the distant point.

8 Claims, 5 Drawing Sheets

FIG. 4 ated Oct. 27, 1999, the contents of which are incorporated herein by reference.

METHODS FOR ESTABLISHING RELIABLE COMMUNICATIONS BETWEEN TWO POINTS IN A MOBILE WIRELESS NETWORK

CROSS-REFERENCE TO RELATED APPLICATIONS

This application claims the benefit of U.S. Provisional Application No. 60/161,832, filed Oct. 27, 1999, the contents of which are incorporated herein by reference.

BACKGROUND OF OUR INVENTION

1. Field of the Invention

Our invention relates generally to reliable wireless communications between two points in a wireless network. More particularly, our invention relates to methods of providing reliable communications between mobile wireless nodes or subsets positioned at two points in a wireless network, wherein no two nodes between these two points can directly reliably communicate.

2. Description of the Background

A basic necessity for two wireless nodes wishing to communicate in a wireless communications network is for these nodes to overcome the loss and variability of the propagation environment between them to establish reliable communications. This necessity holds true whether the two nodes are both mobile (as seen in military applications and emerging mobile, multi-hop wireless networks) or whether one node is static and the other node is mobile (as seen in commercial applications where the mobile node only communicates with a "base-station").

One common solution to provide reliable communications is for the transmitter to radiate sufficient or increased power to overcome the propagation environment. The problem with this solution is that it is not always possible to increase transmit power. This holds true for military applications where it is not desirable to increase power because it can divulge a mobile transmitter's position. This solution is also not viable for commercial applications where (1) the power levels of the mobile nodes are decreasing as the units continue to get smaller, and (2) increased power comes at the price of reduced battery life.

Another solution is to add additional base stations and/or repeaters to the wireless network in order to minimize the maximum distances between transmitters and receivers. One problem with these solutions is that it is costly to deploy additional equipment. Another problem is that these solutions are not viable for fast deployable, wireless infrastructure networks, where the networks are dynamically formed and move, as have been seen in the military sector and are emerging in the civilian/commercial sector (further described below as "multi-hop" networks).

A third solution is the emerging mobile, multi-hop wireless network ("multi-hop" networks). In these networks, each mobile wireless node not only acts like a source of data, but also as a router. The basic assumption in these networks is that wireless nodes within the network are willing to forward data for other nodes in the network that are not able to establish direct reliable communications. Multi-hop networks are applicable to military applications. They are also applicable to users wishing to establish "on-demand" networks (such as for rescue missions in times of natural disaster, law enforcement, or business and educational use, etc.), and are applicable to cellular networks where a mobile node may not be able to establish direct communications with a base-station for access to wire-based networks.

Advantageously, multi-hop networks do not require the need for additional static hardware. They also solve the problem regarding increased transmission power, assuming there are enough mobile nodes in close proximity to establish a reliable path. However, this latter assumption may not hold true. For example, under military and emergency applications, the number of mobile nodes may be small and may not be in close proximity. In addition, mobile nodes in general are often turned off when not in use, reducing the number of available units to repeat data. Lastly, mobile nodes expected to be left on for a long duration may have low transmit power to ensure prolonged battery life. Hence, while multi-hop networks present a solution for two distant wireless nodes to establish communications through a multi-hop path, it may not be possible to establish one or more hops along this path without requiring increased transmit power.

Existing technologies allow wireless nodes to form reception and transmission groups to overcome the loss of a propagation environment however, these groups are based on static, not mobile nodes. Code Division Multiple Access (CDMA), which is based on spread spectrum technology, provides a soft hand-off feature that allows a single mobile node to simultaneously transmit and receive signals with more than one base station. The mobile node is capable of coherently combining the signals from the multiple base stations in order to achieve a signal to noise ratio (SNR) that is higher than the SNR from any one base station. This is accomplished through the use of a Rake receiver that introduces the appropriate delay for each received signal and then combines them. Similarly, multiple base stations are able to receive the same signal from a mobile node, each base station demodulating the signal and sending its corresponding information to a collection point, which then selects the best signal on a frame by frame basis.

Similarly, under the existing antenna and adaptive-antenna array technologies, the antennas are physically separated in space from each other and have independent receivers. These antenna systems are capable of receiving separate signals and coherently combining these signals at a central location.

Hence, these current systems/technologies allow multiple stationary units to form dynamic groups that can simultaneously receive and coherently combine a signal transmitted by a single mobile node thereby overcoming a "lossy" propagation environment. Similarly, a single mobile node can receive and coherently combine a signal simultaneously transmitted by the group of stationary units.

SUMMARY OF OUR INVENTION

It is desirable to have a method that overcomes the disadvantages of prior art solutions and provides reliable communications between mobile wireless nodes positioned at two points in a wireless network wherein no two nodes between these points are able to establish reliable direct communications due to the loss and variability of the propagation environment. Under prior art solutions, two mobile nodes between these two points could communicate by increasing transmit power, by utilizing additional static hardware added to the network, or by routing their signals through other mobile nodes. However, these solutions are not always viable. Our invention addresses this problem through the dynamic formation of transmit and receive groups at the two points. Specifically, mobile nodes at the two points, upon determining an inability to communicate, form groups to simultaneously transmit and receive data, their combined efforts overcoming the loss of the propagation environment. The basic concept behind our invention is that even though two wireless nodes are not capable of reliably transmitting/receiving a signal over a propagation environment, a group of mobile nodes combined may be able to transmit and/or receive a signal over the environment.

Our invention is conceptually an extension of existing systems, such as CDMA and adaptive antennas as described above, and can be implemented by utilizing these core technologies. However, our invention is substantially different from these existing systems in that our invention is directed at the dynamic formation of groups consisting of mobile wireless nodes that ban together for the duration of the reception/transmission and then disband once the communications are complete. Advantageously, our invention overcomes the need to add expensive hardware to the network and overcomes the need for increased transmit power. In addition, although our invention is very applicable to multi-hop networks, our invention resolves the problem when one or more hops within the multi-hop route cannot be established due to the loss of the propagation environment.

Through methods in accordance with our invention, mobile wireless nodes periodically probe their surroundings in order to discover and establish reliable communications with nearby neighboring nodes. This process allows nodes to create and maintain a neighbor list that can later be used in the formation of the dynamic transmit/receive groups.

Prior to establishing a route or transmitting data, a mobile node, A, must first determine if it can establish reliable communications with mobile nodes at a next point in the network. Node A makes this determination by first transmitting an "Alert-Request" "Radio Agent" probe to distant mobile nodes. If any one node can reliably receive the probe, groups are never formed and communications occur through this node as normal. However, if none of the distant nodes are able to reliably receive the probe, the nodes attempt to form a group through the use of their neighbor lists. The purpose of the group members is to individually receive all future data sent by A and combine this data to create a reliable signal. In the process of forming this group, the nodes will choose a controlling-point node whose purpose is to collect the data received by the individual nodes in the group and to "combine" the data to create a reliable signal.

Assuming the controlling-point node is able to reliably receive the "Alert-Request" "Radio Agent" probe through the combined efforts of the group, the controlling-point node will respond to A with an "Alert-Response" "Radio Agent" probe that informs A to proceed with the intended communications. However, the controlling-point node assumes that if a group is needed to reliably receive data from A, a group will also be needed to reliably send data to A. Hence, the controlling-point node transmits the response by having all nodes in the group transmit the response. All future communications between A and the group of nodes proceed by having the group simultaneously receive and transmit data thereby ensuring the reliability of the data. Once communications are complete, the group disbands.

As just described, it is assumed that when the group sends the response-probe to node A, node A can reliably receive the probe and communications proceed. However, it is possible that node A will not reliably receive this response. As with the "Alert-Request" probe, all mobile nodes near node A will receive the "Alert-Response" probe that will trigger these nodes to form a group, with node A acting as controller, in an attempt to reliably receive the probe. Like above, this group will function to jointly transmit and receive future intended data. Hence, all future communications between the two points will occur through a transmit/receive group at each point, each group combining its resources to ensure reliable communications. Once communications are complete, the two groups disband.

The advantage of our invention is that it does not require any one node to increase its transmit power, it does not require new static hardware, and although applicable to multi-hop networks, does not assume two points in this network are always able to establish a multi-hop path.

Thus, our invention embodies methods for providing reliable communications between two points within a wireless network wherein these two points consist of one or more mobile nodes but no two nodes between these points are able to directly reliably communicate. Under our invention, mobile nodes within close proximity to the transmitting node and/or close proximity to the receiving node form dynamic groups whereby a group simultaneously transmits or receives the signal, the combined efforts thereby ensuring reliable communications.

DETAILED DESCRIPTION OF OUR INVENTION

Figure 1A:
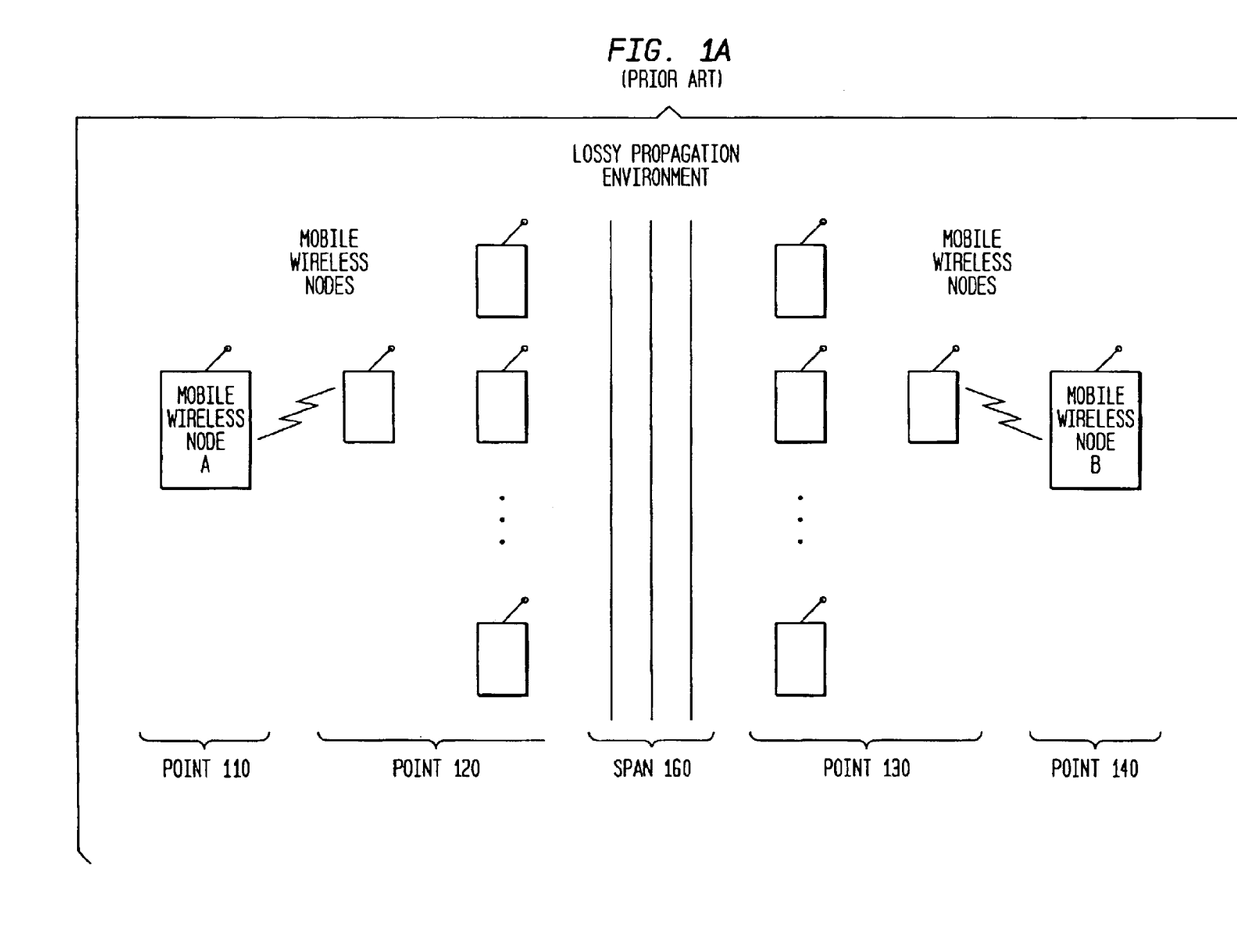
FIG. 1A depicts a prior art wireless network, to which our invention is applicable, the network consisting of two mobile nodes, A and B, unable to establish multi-hop communications due to a lossy propagation environment.
Figure 1B:
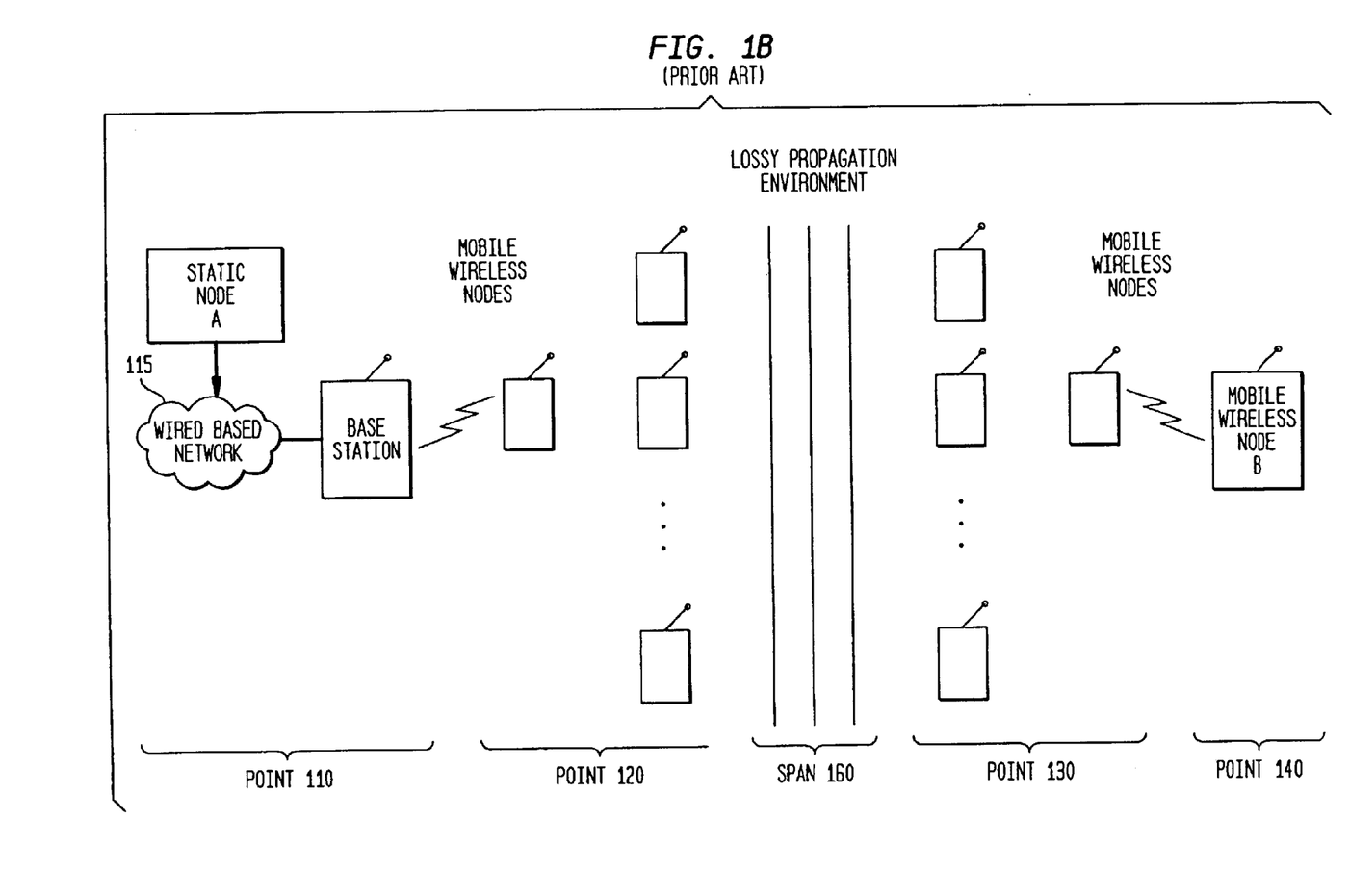
FIG. 1B depicts a prior art wireless network, to which our invention is applicable, the network consisting of a static node, A, and a mobile node, B, unable to establish multi-hop communications due to a lossy propagation environment.

Our invention is directed at providing reliable communications between mobile wireless nodes positioned at two points within a wireless network However, no two nodes between these two points can directly reliably communicate due to the loss and variability of the propagation environment. FIGS. 1A–B show several example configurations of prior art networks to which the methods of our invention may be applied. FIG. 1A shows a multi-hop network where two mobile wireless nodes, A and B, situated at points 110 and 140 wish to communicate. Node A can reliably communicate with one or more mobile nodes at point 120 and node B can reliably communicate with one or mobile nodes at point 130. However, no two nodes between points 120 and 130 can reliably communicate over span 160, resulting in an inability to complete the multi-hop route between nodes A and B. This situation can also arise if nodes A and B attempt to establish direct communications over span 160. FIG. 1B displays a similar example, the difference being the inclusion of a wired based network, 115, wherein mobile nodes at points 120 and 130 are unable to directly reliably communicate over span 160 resulting in an inability for nodes A and B to communicate.

Under the prior art, reliable communications over span 160 could be provided by adding additional static hardware to the network through which mobile nodes at points 120 and 130 would communicate, by requiring mobile nodes at points 120 and 130 to increase transmit power, or by requiring mobile nodes at points 120 and 130 to find an alternate route, if possible. However, as indicated above, these solutions are not always viable.

Figure 2:
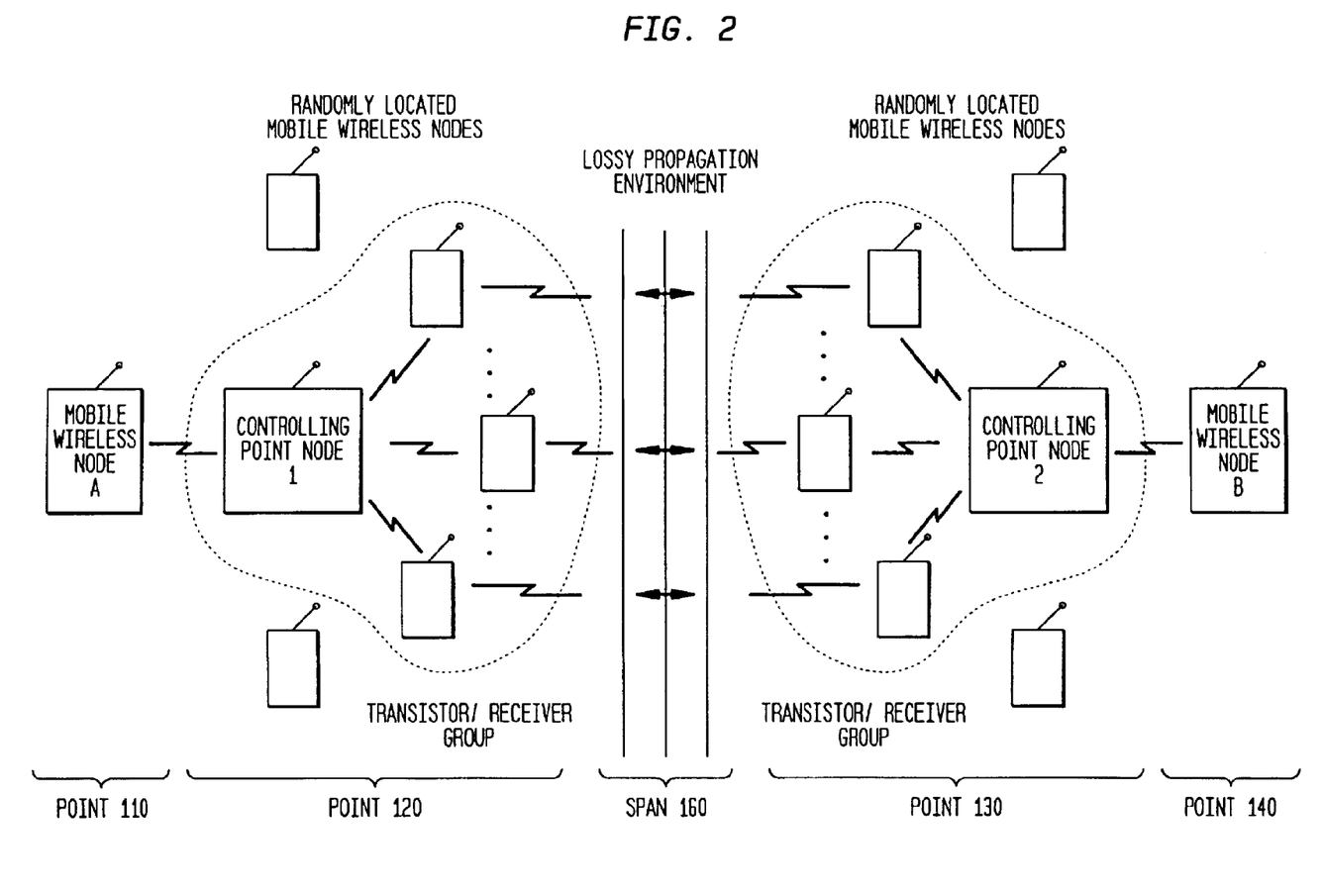
FIG. 2 illustrates the method of our invention applied to the networks of FIGS. 1A and 1B, whereby mobile nodes dynamically form transmit and receive groups thus allowing mobile nodes A and B to establish reliable communications over a lossy propagation environment.

Using FIG. 2 as a general illustration as to how our invention addresses the problem, assume the mobile nodes at point 120 can reliably communicate with each other and the mobile nodes at point 130 can directly reliably communicate with each other, but no two nodes between these two points can reliably communicate due to the loss of the propagation environment. The mobile nodes at point 120, and similarly at 130, can take advantage of each other to utilize their combined resources and work together to enhance signal reception and transmission and thereby provide reliable communications.

Assume that node A wishes to establish a route and transmit data to node B. Node A will attempt to establish these communications through the nodes at points 120 and 130. As part of establishing these communications, a pair of nodes between points 120 and 130 will first determine if they can establish reliable communications. Assuming this is not possible, the mobile nodes at these two points will dynamically form groups to simultaneously transmit and/or receive data over span 160, the combined efforts thereby providing reliable communications, as shown in FIG. 2. Hence, groups are formed on an as need basis. Note that if a pair of nodes between points 120 and 130 are able to reliably communicate, transmission proceeds as normal and groups are never formed.

As part of group formation, each group will dynamically choose a "controlling-point node", like nodes 1 and 2. With respect to transmission, node 1 will pass a "copy" of all data from node A to each member of the group at point 120, which group will subsequently simultaneously transmit the data to point 130. With respect to reception, members of the group at point 130 will simultaneously receive the data, presumably containing errors, and pass the data to controlling-point node 2, which will combine the "copies" to enhance the overall signal to noise ratio of the message. Node 2 will subsequently pass the error-free data to node B. Similar methods are followed for transmitting data from node B to node A. Hence, route formation and all subsequent data transfers occur through the two groups, whose joint operation ensures reliable transmission. Once nodes A and B complete communications, the groups at points 120 and 130 are dissolved and the mobile nodes once again function independently. In this cooperative, minimum energy, wireless communication architecture, "multiple links" thus carry the same information. Advanced multi-input signal processing techniques are used to dramatically improve the outage probability of this combined channel over the performance achievable over any single link.

In this wireless system, the mobile nodes operate under a hierarchiless environment in that no node is ever statically designated as being a controlling-point node and no node is ever statically assigned to a group. Mobile nodes that happen to be in close proximity at a given time work together to form groups as the need arises. A controlling-point node is chosen based on criteria discussed below. Once formed, a group jointly operates to transmit/receive data, and then subsequently disbands.

Thus, it is an aspect of our invention that mobile rather than static nodes form groups and the members of these groups are never predefined. The advantage of our invention over the prior art is that it does not require the addition of new static hardware to the network, does not require pre-configuration of the network, and although it is applicable to multi-hop networks, it overcomes the assumption that adjacent nodes in a routing path can reliably communicate.

The following discussion will first cover a method by which wireless nodes periodically determine their neighboring nodes, from which transmission/reception groups can be formed. Next, a method for forming reception groups is discussed, followed by a discussion of the formation of transmission groups, concluded by a discussion of grouping for transmission and reception.

Note that our invention makes no assumptions as to the under-lying technologies and can be implemented through existing radio technologies and access protocols. As an example, spread spectrum technologies are applicable given that our invention relies on several nodes acting as a single receiver and thereby each node would need to receive on the same frequency. Similarly, when multiple nodes are used for transmission each node would need to transmit on the same frequency.

As described above, it is assumed that each node at a given point is aware of its neighbors and can reliably communicate with these neighbors to form dynamic groups as the need arises. However, due to the dynamic nature of our invention and the fact that, inherently, a mobile network constantly changes configuration, the ability to communicate with neighboring nodes is not predefined. As such, each mobile node in the network must periodically determine the presence of other nodes and the communication parameter settings required to communicate with these nodes.

On a periodic basis, based on the movement and density of surrounding mobile nodes, a mobile node will broadcast a "Discovery-Request" "Radio Agent" probe to discover and establish reliable communications with one or more nearby neighboring nodes. This probe will be repeated with varying transmission parameters with the intent of establishing reliable communications with at least one other node.

A node will first send the "Discovery-Request" "Radio Agent" probe with transmit parameters equal to "normal" connectivity. If a "Discovery-Response" "Radio Agent" probe is not received within a designated time-out period, the node will re-adjust the transmit parameters of the system and transmit again. Re-adjustment of the parameters can proceed along two paths. The first path is to incrementally increase the transmit power while maintaining the communication data rate. The second path is to maintain the standard transmit power level and incrementally decrease the communication data rate. For those mobile nodes and applications where increased power is possible, the first path is followed until maximum power is reached. If communications are still not possible, the second path is utilized. For mobile nodes and applications where increased power is not preferred, the second path is attempted prior to the first.

The transmitting node will embed in the header of each "Discovery-Request" probe the transmit-parameter settings used by that node in transmitting the request. The header will be designed for a very high processing gain so the header can be decoded even in severe communications environments. When a nearby node is able to reliably receive a "Discovery-Request" probe, it will respond with a "Discovery-Response" probe, in which it will either agree with the current settings or suggest a different power and/or data rate to use for communications. Lastly, the node originating the request will confirm the communication parameters with the responding node. As a result of these exchanges, the originating node will create and maintain a list of neighboring nodes along with the necessary communication parameters to reliably communicate with these nodes.

Once each node is able to establish reliable communications with its "neighboring nodes", these nodes can collaboratively form dynamic groups, as the need arises, to establish reliable communications with a distant node.

Reference will now be made to the formation of a dynamic group in order to receive a signal. Using FIG. 3 as a basis for description, mobile node A wishes to send a series of data packets to mobile node B. As an overview, prior to establishing a route to node B and prior to transmitting the data packets over this route, node A will first ensure that a reliable next hop on route to node B, or node B itself, can be established. As such, node A will first broadcast an "Alert-Request" "Radio Agent" probe that alerts the mobile wireless nodes in the network (i.e., the nodes at point 130) to the future arrival of data. Each wireless mobile node at point 130 that receives the "Alert-Request" probe will make one of two distinctions: either it can or cannot successfully demodulate the "Alert-Request" probe. (Note, the "Alert-Request" probe contains a header and test data. The header will be designed for a very high processing gain so that it can be decoded even in severe communications environments. "Successful demodulation" in the following discussions refers to demodulation of the test-data).

Figure 3:
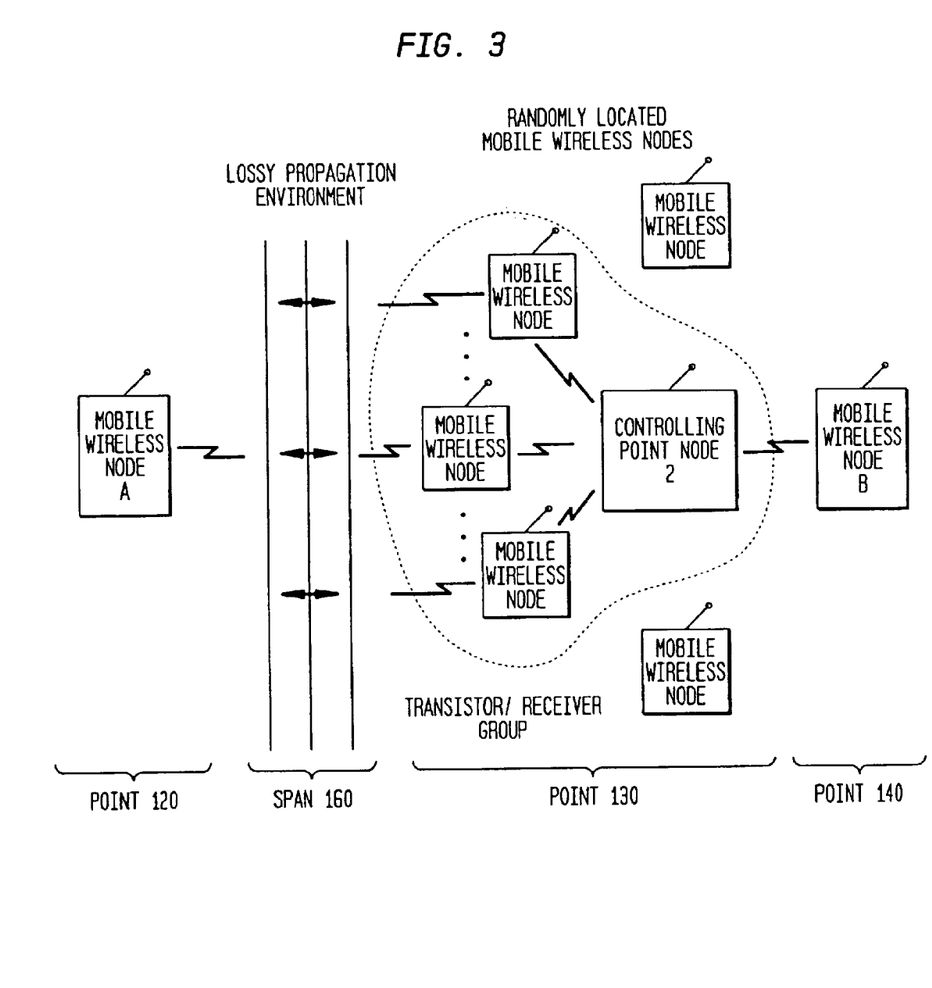
FIG. 3 illustrates an application of our invention whereby mobile wireless nodes A and B are able to communicate over a lossy propagation environment through the dynamic formation of a mobile receive/transmit group at one point within the wireless network.

If one or more nodes can successfully demodulate the probe, then the nodes will proceed to negotiate which node will handle all proceeding communications with node A, and no receive group will be formed. The chosen node will respond to node A with an "Alert-Response" "Radio Agent" probe and routing and data transmission will proceed as normal.

If none of the nodes at point 130 are able to demodulate the probe, the nodes will proceed to negotiate the formation of a group of wireless nodes necessary to successfully demodulate/receive the probe. As part of the group formation, the nodes will negotiate/choose a controlling-point node, to which all nodes in the group will forward the probe and all future data they receive from node A. Once group and controlling-point node negotiations are complete, the controlling-point node will send an "Alert-Response" "Radio Agent" probe to node A. Subsequently, node A will complete route formation and will transmit the series of data packets to node B, with all data going through the group, to the controlling-point node, and onto node B.

More specifically, node A first transmits an "Alert-Request" "Radio Agent" probe towards the nodes at point 130 to alert these nodes as to the future arrival of data. This probe is sent at a data rate corresponding to the data rate at which A would like to establish communications with B. Assume that nodes 302–304 in FIG. 3 receive this probe. If a node is able to successfully demodulate the probe, it generates a "Successful-Reception" "Radio Agent" probe and sends this probe to other nodes in its neighbor list, thereby notifying these nodes that there is no need to form a group. If a node is not able to successfully demodulate a signal, it generates a "Receive-group Request" "Radio Agent" probe and sends this probe to other nodes in its neighbor list requesting that a group be formed. As indicated earlier, if one or more nodes are able to successfully demodulate the "Alert-Request" probe, a receive group is never formed and all transmissions to/from node A occur through one of these nodes.

Assume that none of the nodes are able to successfully demodulate the probe and thereby generate "Receive-group Request" "Radio Agent" probes to request that a group be formed. In general, two different types of groups can be formed based on a collective view of the signal quality of the "Alter-Request" probe at each node, and the degree of error experienced by each node when trying to receive the signal. If the error rate is low, each individual node is able to demodulate the received probe with some errors and as such, combining techniques based on recovered bits can be used. In this case, the controlling-point node can, for example, determine which nodes have the strongest signals and based on each node's demodulated bits and error-correcting bits, use majority detection to correct the errors and to incoherently combine the signals. If the error rate is high, this technique will not work and combining techniques based on coherently combining the signals must be used. Each node will initially make an independent determination as to the degree of the signal error and choose one of these two general recovery techniques, one of which will be subsequently negotiated and used by the group to recover all subsequent data.

Figure 4:
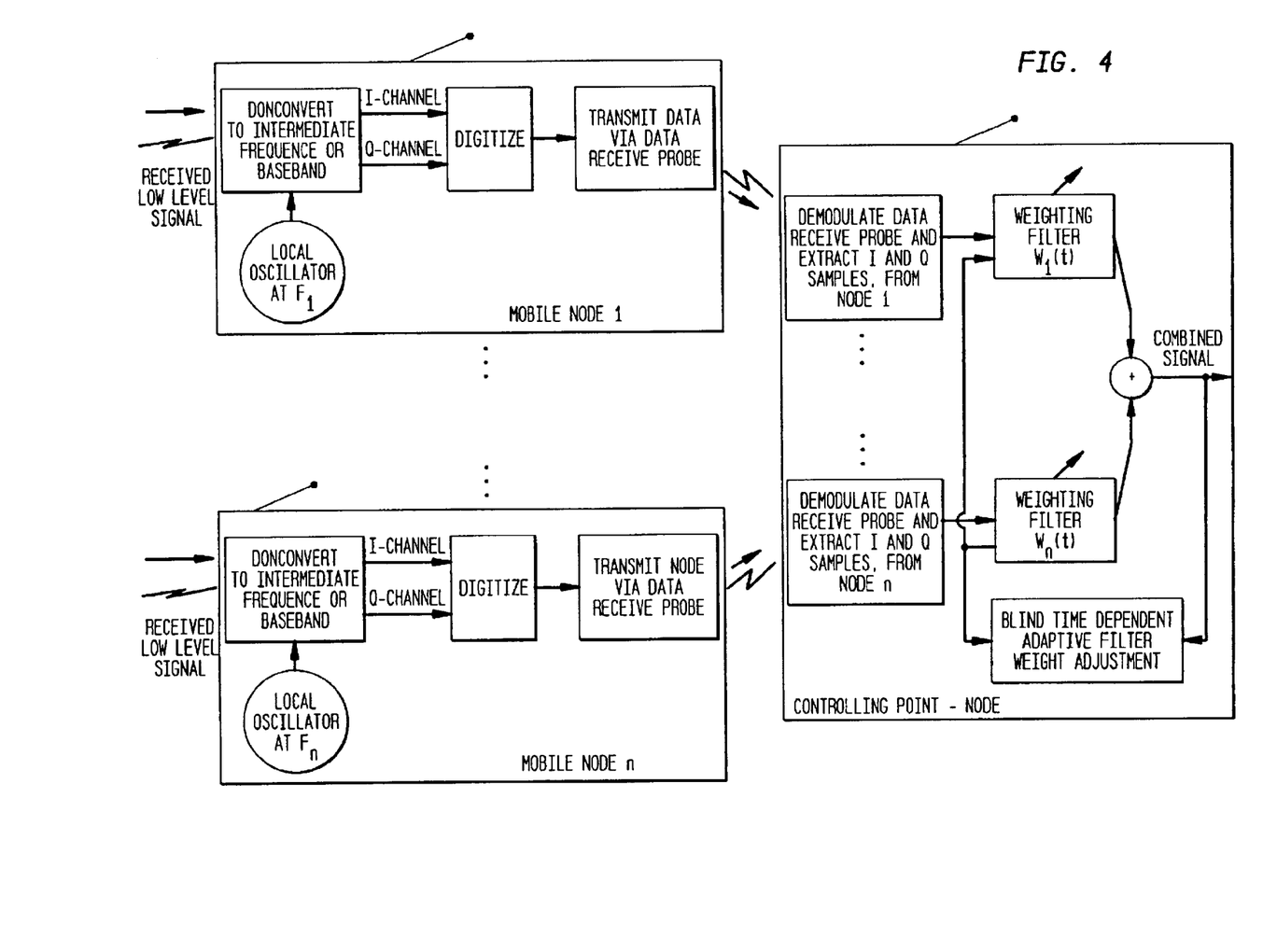
FIG. 4 illustrates an embodiment for coherently combining a signal received by a receive group under the methods of our invention.

Note in general that existing CDMA and antenna array technologies can be adapted for our invention to combine signals in the above manners. As a specific example, FIG. 4 shows a coherent combining technique based on antenna array systems. In this example, each node down-coverts the received signal to an intermediate frequency or base-band and passes the resultant I and Q components to the controlling-point node. The controlling-point node applies time varying weights to the I and Q samples from each node using a "Time Dependent Adaptive Filter" to account for the fact that each node used a different oscillator to down-convert the signal. The resultant signals are then combined.

Hence, upon determining the signal quality, each node will generate the "Receive-Group Request" probe and embed in this probe the signal quality of the received Alert probe and either the demodulated bits or the sampled bits to tell other nodes how well it received this probe. A given node will send its "Receive-group Request" probe to each node within its neighbor list.

Upon receiving a "Receive-group Request" probe, a given node will respond to the sending-node with a "Receive-Group Response" "Radio Agent" probe indicating the signal quality and proposed grouping technique at that node. It is important to note that the nodes at a given point will not have identical entries in their neighbor lists, that a node listed in a neighbor list may no longer be accessible, and that certain nodes, such as node 301 in FIG. 3, will receive "Receive-Group Request" probes even though they did not receive the initial "Alert-Request" probe from node A. As a result of generating the Request and Response probes, the nodes at point 130 are able to determine the relative signal levels at the other nodes, which nodes are/are not receiving the initial communications from node A, etc.

From this relative "picture" of the surrounding nodes, the nodes next negotiate for one of them to become the controlling-point node and to take control of the combining process using one of the techniques described above. The method for choosing a controlling-point node can be based on, for example, (1) which node has the best "receive" signal quality, (2) which node is able to communicate with a maximum number of nodes that received the Alert probe, etc. To initiate the negotiation process, each node that generated a "Receive-Group Request" and/or "Response" probe next generates a "Negotiation-Controller Request" "Radio Agent" probe and sends this probe to each node in its neighbor list. Assuming the second method above is used, each node would indicate in this probe the number of nodes that sent it a "Receive-Group Request" probe.

Each node, based on the received "Negotiation-Controller Request" probes, independently chooses a node to act as controller and indicates this choice to the other nodes through a "Negotiation-Controller Response" "Radio Agent" probe. Based on the nodes' choices for controller, one node (node 301 in the case of FIG. 3) will assume control and generate a "Group-Controller" "Radio Agent" probe, which it sends to all nodes that sent it a "Receive-Group Request" probe. This probe informs the nodes as to which nodes are in the group, as to which detection combining technique will be used for future messages received from node A, and to forward all messages received from node A to this node. At this point, the receive group is formed with a designated controller. It should be noted that the group might not consist of all the original nodes that originally received the "Alert-Request" probe.

Once the group is formed, each group member forwards the initially received "Alert Request" probe to the controlling-point node (through a "Data-Receive" probe), which combines these individual messages, based on the chosen combining technique. Assuming the controlling-point node is able to reliably demodulate the "Alert Request" probe upon combining the individual signals, the controlling-point node will generate, in response, an "Alert Response" "Radio Agent" probe to node A, which probe indicates to node A that it may proceed with establishing routes and transmitting the series of data packets to node B. These subsequent data packets from node A will be received by nodes 302–304, forwarded to node 301 for combining, and then forwarded to node B, thereby ensuring reliable communications. However, if the controlling-point node is not able to reliably receive the "Alert Request" probe upon combining the individual signals, the controlling-point node will generate an "Alert-Response" probe to node A, indicating to node A that it was not able to reliably receive the probe. In response, node A will transmit to the group of nodes at point 130 a new "Alert Request" probe at, for example, a lower data rate, in an attempt to establish communications. This probe is received by the group and then forwarded to the controlling-point node, proceeding as above.

It should also be noted that the formation of the receive group at point 130 could have occurred if transmission was initiated by node B rather than node A. For example, node B would forward data to node 301. Similar to node A above, node 301 would broadcast an "Alert Request" probe to alert node A to the arrival of data. Regardless of whether node A reliably or unreliably receives this probe, node A will respond with an "Alert-Response" probe. Like the receipt of the "Alert-Request" probe above, receipt of the "Alert-Response" probe triggers the nodes at point 130 to form a group, as described above.

Reference will now be made to the formation of a dynamic group in order to transmit a signal. Under our invention, a transmit group is only formed when a receive group is first formed and as such, the members of the transmit group are the same members as the receive group, with the controlling-point node maintaining control. This automatic creation of a transmit group is based on the assumption that if a group of nodes was needed to reliably receive data from a distant node, then a group of nodes will also be needed to reliably transmit data to that node.

Hence, continuing the discussion above, when node 301 transmits the "Alert-Response" probe in response to node A's "Alert-Request" probe, node 301 will pass the "Alert-Response" probe (through a "Data-Transmit" probe) to the receive group nodes, 302–304, for transmission to node A, thereby forming a transmit group. Similarly, if node B initiates communications with node A, node 301 transmits the "Alert-Request" and forms a receive group on receipt of the "Alert-Response" probe from node A. All subsequent transmissions by node 301 will be through nodes 302–304, thereby again forming a transmit group.

The transmit group can transmit data either coherently or incoherently to the distant node. The controlling-point node determines the method, which largely depends on the transmit powers of the group. If the individual nodes within the transmit group have high transmit powers, are accurately synchronized, and accurately know their differential positions (e.g., through Global Positioning Systems), then it is possible for the nodes to simultaneously transmit their copies of the signal such that the signals coherently combine at node A, which receives the signals through a Rake receiver. If the individual nodes within the transmit group have low transmit powers, then the transmit group may weight, phase, and delay the signals (i.e. act incoherently), with node A then combining the signals based on them being individually received. Regardless of the method used, the controlling-point node will provide each member of the group with the method, transmit time, weight, phase, etc. each time, for example, that it passes them data to transmit. Note in general that existing CDMA and antenna array technologies can be adapted for our invention to transmit signals in the above manners.

The above discussion, with respect to FIG. 3, analyzed reliable communications between two points in a wireless network where a receive/transmit group was formed at only one of two points. It was assumed that node A was isolated (i.e., had no neighboring nodes) and that the formation of the receive/transmit group at point 130 was adequate to establish reliable communications. If this was not the case, node A would attempt to establish reliable communications with the group by, for example, reducing the data rate.

However, it is possible that both points consist of several mobile nodes and that transmit/receive groups are formed on both sides. For example, referring back to FIG. 2 assume that node A wishes to communicate with node B, node A can reliably communicate with node 1, node B can reliably communicate with node 2, the nodes at point 120 can reliably communicate, the nodes at point 130 can reliably communicate, but no two nodes between points 120 and 130 can directly reliably communicate. Node A will pass data to node 1. Like above, node 1 will first send an "Alter-Request" probe to the nodes at point 130. The "Alter-Request" probe will initiate the formation of receive/transmit group at point 130, with node 2 acting as controller. Node 2 will analyze the "Alert-Request" probe, determine that the communications are still not reliable, and transmit in response, through the group at point 130, an "Alter-Response" probe to node 1 indicating unreliably reception. All nodes at point 120 will receive this "Alter-Response" probe, and assuming that none of these nodes can reliably receive this probe, will form a receive/transmit group, with node 1 becoming the controlling-point node. Collectively, the nodes at point 120 will then retransmit the "Alter-Request" probe with the nodes at point 130 collectively receiving the probe in order to establish communications.

Once reliable communications are established between the two groups, all communications between A and B over span 160 will occur through nodes 1 and 2, with node 1 receiving/transmitting through the group at point 120 and node 2 receiving/transmitting through the group at point 130. As above, when A and B complete communications, the two groups disband.

We claim:

1. A method for establishing a reliable communication between two points in a mobile wireless network, wherein said first point comprises a first mobile wireless node and said second point comprises a plurality of mobile wireless nodes, said method comprising the steps of:

creating a neighbor list by each of said plurality of nodes at said second point;

transmitting an alert request probe signal from said first node to said plurality of nodes at said second point;

if none of the nodes at said second point can reliably receive the alert request probe signal, forming a receive group, consisting of at least some of said plurality of nodes at said second point and based on the created neighbor lists and the received probe's signal quality;

choosing a controlling node from said receive group;

transmitting a communication signal from the first node to the second node;

receiving by each member of said receive group the communication signal;

passing by each member of said received group a representation of the received communication signal to said controlling node; and combining by said controlling node the representations of the communication signal to create a reliable communication signal.

2. The method of claim 1 further comprising the steps of:

transferring a copy of a second communication signal from said controlling node to each member of said receive group;

transmitting by each member of said received group said second communication signal to said first node; and combining by said first node received representations of said second communication signal thereby creating a second reliable communication signal.

3. A method for operating a mobile wireless communication network comprised of a first plurality of mobile wireless nodes at a first point, a second plurality of mobile wireless nodes at a second point, wherein no two nodes between said first and second points can directly reliably communicate, wherein a subset of said first plurality of nodes have formed a first dynamic group consisting of a first controlling node, and wherein a subset of said second plurality of nodes have formed a second dynamic soup consisting of a second controlling node, said method whereby said first controlling node reliably passes data to said second controlling node comprising the steps of:

passing a first representation of data from said first controlling node to each member of said first dynamic group;

transmitting said first representation of data from each member of said first dynamic group to said second point;

receiving said trans mined data at each member of said second dynamic group;

passing second representations of said data received by each member of said second dynamic group to said second controlling node; and combining said second representations at said second controlling node to create a reliable signal.

4. A method for establishing reliable communications between a first point and a second point in a wireless network, wherein said first point includes an originating mobile wireless subset and said second point includes a plurality of mobile wireless subsets, said method comprising the steps of:

creating a neighbor list by each subset at said second point;

based upon said neighbor lists, forming a group consisting of a controlling subset and other subsets at said second point to receive and transmit communication messages between said originating subset and said second point;

receiving by each member of the group a communication message transmitted by said originating subset and destined for said second point;

forwarding by each member of the group to a controlling subset a representation of the received communication message;

combining said representations of said message at said controlling subset to create a reliable communication message:

forwarding by the controlling subset to each member of the group a copy of a second communication message to be transmitted from said second point to said originating subset; and combing by said originating subset received representations of said second communication message.

5. A method for establishing reliable communications between two points in a mobile wireless network, wherein said first point comprises a first mobile wireless node and said second point comprises a plurality of second mobile wireless nodes, said method comprising the steps of:

transmitting an alert request probe signal from said first node to said plurality of second nodes to determine if at least one of the second nodes can reliably receive the alert request probe signal;

if none of the second nodes at the second point can reliably receive the alert request probe signal, the second nodes forming a receive group comprising at least some of said second nodes and choosing a controlling point node in the receive group;

transmitting by the controlling point node a response probe signal to the fight node at the first point informing the first node to proceed with the communication to the second nodes at the second point; and collecting by the controlling point node the communications received by the second nodes in the receive group and combining the collected communications by the controlling point node to create a reliable signal at the second point.

6. The method of claim 5 further comprising:

nodes at the fist point forming a group with the first node if the first node can not reliably receive the response probe signal from the controlling point node at the second point with the first node acting as the controller node for the group at the first point.

7. The method of claim 5 wherein the step of the controlling point node at the second point transmitting a response probe signal comprises the controlling point node causing all of the second nodes in the group to transmit the response probe signal.

8. The method of claim 5 further comprising forwarding by the controlling point node to each of the second nodes in the receive group a message to be transmitted from said second point to said first mobile wireless nods;

transmitting by each of said second nodes in the receive group said message; and     combining by said first mobile wireless node the messages from each of said second nodes in the receive group.

\* \* \* \* \*

UNITED STATES PATENT AND TRADEMARK OFFICE
CERTIFICATE OF CORRECTION

PATENT NO. : 6,898,430 B1
DATED : May 24, 2005
INVENTOR(S) : Liberti et al.

It is certified that error appears in the above-identified patent and that said Letters Patent is hereby corrected as shown below:

Title page,
Item [73], Assignee, change "Telecordia" to -- Telcordia --

Column 11,
Line 42, change "receive" to -- received --
Line 55, change "soup" to -- group --
Line 66, change "trans mined" to -- transmitted --

Column 12,
Line 31, change "combing" to -- combining --

Column 13,
Line 4, change "nods;" to -- nodes; --

Signed and Sealed this

Twelfth Day of July, 2005

JON W. DUDAS
*Director of the United States Patent and Trademark Office*

UNITED STATES PATENT AND TRADEMARK OFFICE
CERTIFICATE OF CORRECTION

PATENT NO.        : 6,898,430 B1
APPLICATION NO.   : 09/698970
DATED             : May 24, 2005
INVENTOR(S)       : Liberti et al.

Page 1 of 2

It is certified that error appears in the above-identified patent and that said Letters Patent is hereby corrected as shown below:

On the Title Page, Item (57), under "ABSTRACT", in Column 2, Line 7, delete "relaibly" and insert -- reliably --, therefor.

On the Title Page, Item (57), under "ABSTRACT", in Column 2, Line 16, delete "Similary," and insert -- Similarly, --, therefor.

In the Drawings

In Fig. 4, Sheet 5 of 5, delete "  " and insert --  --, therefor.

In the Specification

In Column 4, Line 52, delete "network" and insert -- network. --, therefor.

Signed and Sealed this
Eighteenth Day of November, 2014

Michelle K. Lee
*Deputy Director of the United States Patent and Trademark Office*

In Column 5, Line 63, delete "hierarchiless" and insert -- hierarchies --, therefor.

In Column 7, Line 66, delete ""Receive-group Request"" and insert -- "Receive-Group Request" --, therefor.

In Column 8, Line 7, delete ""Receive-group" and insert -- "Receive-Group --, therefor.

In Column 8, Line 45, delete ""Receive-group Request"" and insert -- "Receive-Group Request" --, therefor.

In Column 8, Line 48, delete ""Receive-group Request"" and insert -- "Receive-Group Request" --, therefor.

In the Claims

In Column 11, Line 23, in Claim 1, delete "group," and insert -- group --, therefor.

In Column 12, Line 26, in Claim 4, delete "message:" and insert -- message; --, therefor.

In Column 12, Line 49, in Claim 5, delete "fight node" and insert -- first node --, therefor.

In Column 12, Line 58, in Claim 6, delete "fist point" and insert -- first point --, therefor.